US006952568B2

(12) United States Patent
Lin

(10) Patent No.: US 6,952,568 B2

(45) Date of Patent: Oct. 4, 2005

(54) TRACKING POWER LEVELS IN A WIRELESS TELECOMMUNICATIONS NETWORK

(75) Inventor: Wen-Pin Lin, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 678 days.

(21) Appl. No.: 09/759,685

(22) Filed: Jan. 12, 2001

(65) Prior Publication Data

US 2002/0094782 A1 Jul. 18, 2002

(51) Int. Cl.[7] .......................... H03C 1/62; H04B 17/00

(52) U.S. Cl. .................... 455/115.4; 455/424; 455/508; 455/67.7; 455/557; 455/90.1; 455/245.1; 455/226.4

(58) Field of Search ................................ 455/423–425, 455/508, 515, 66.1–67.7, 556.1, 557, 566, 90.1, 115.4–115.1, 226.1–226.4, 69, 232.1–253.2, 560, 561, 344, 67.13; 379/32.01

(56) References Cited

U.S. PATENT DOCUMENTS 4,163,121 A * 7/1979 Yoshikawa et al. ......... 455/424
5,023,900 A * 6/1991 Tayloe et al. ............ 379/32.01
5,289,526 A * 2/1994 Chymyck et al. ........... 455/424
5,875,398 A * 2/1999 Snapp ........................ 455/424
5,943,617 A * 8/1999 Nakamura .................. 455/423
6,016,430 A * 1/2000 Shinomiya .................. 455/515
6,141,565 A * 10/2000 Feuerstein et al. .......... 455/560
6,188,876 B1 * 2/2001 Kim ........................ 455/67.11
6,201,960 B1 * 3/2001 Minde et al. ............... 455/424
6,438,357 B1 * 8/2002 Oh et al. ................. 455/67.14
6,549,781 B1 * 4/2003 O'Byrne et al. ............ 455/446
6,560,442 B1 * 5/2003 Yost et al. .................. 455/423
2002/0115434 A1 * 8/2002 Sasaki et al. ............... 455/424

* cited by examiner

*Primary Examiner*—Charles Craver

(57) ABSTRACT

The present invention is a novel and improved method for monitoring the real time loading condition in a CDMA wireless communication system. The level of the power control signal is obtained by monitoring, in real time, at the base station the forward link CDMA channel, comparing this measurement to the previously obtained level, and displaying the level of the power control signal as a line which can consist of two parts. The first part can be a solid line the length of which represents the level of the power control signal in real time and the second part can be a dotted line whose length increases slowly and decreases rapidly to indicate that the level of the power control signal is rising. Conversely, a rapid increase and a slow decrease of the length of the dotted line indicates that the level of the power control signal is falling. Color coding can be used to indicate that the level of the power control signal is at or outside an optimum operating range.

3 Claims, 2 Drawing Sheets

TRACKING POWER LEVELS IN A WIRELESS TELECOMMUNICATIONS NETWORK

BACKGROUND OF THE INVENTION

1. Field of the Invention

The present invention relates generally to telecommunication systems. More particularly, the present invention is directed to a method for dynamically obtaining in real time the level of the power control signal at a base station 2. Description of the Related Art Code Division Multiple Access (CDMA) is a form of modulation used in telecommunication systems. In CDMA, digital information is encoded in expanded bandwidth format and signals are transmitted simultaneously within the same bandwidth. Mutual interference between signals is reduced by spreading gain between unique codes used for each signal. CDMA permits a high degree of energy dispersion in the emitted bandwidth.

In CDMA systems, the number of signals which can be transmitted simultaneously is limited by the total power of the transmitted signals. Thus, reducing the power of the signals increases the capacity of the telecommunication system. However, reducing the power of a signal increases the error rate of that signal. To maintain minimum power for a given error rate, telecommunication systems employ power control loops.

A typical mobile cellular telecommunication system power control loop varies the power output of the mobile station to maintain a constant frame error rate at the base station. Frame error rate is the number of frame errors divided by the total number of frames observed. A frame error occurs when one or more bit errors occur in a frame of bits. Frame errors are detected after error correction. A frame error rate target is selected to minimize power without compromising signal quality. If the frame error rate exceeds the frame error rate target, the usefulness of the signal is reduced and the power output level of the mobile station is increased to decrease the number of frame errors. If the frame error rate is below the frame error rate target, the power output level, and the power output level of the mobile station is reduced.

A typical frame error rate target for a power control loop is 1%. To develop a confidence level in the frame error rate estimation and control, several frame errors must be observed. Because frame errors occur approximately once out of every 100 frames (assuming the frame error rate target is 1%) and several frame errors are required to develop a confidence factor, the power output level target for the mobile station may only be adjusted once every several hundred frames. During this several hundred frame period, the propagation losses between the mobile and the base station can vary due to movement of the mobile station and interference. This propagation loss variation causes a received power variation in the base station. To accommodate this variable power loss, the mobile station must increase its power output level so that the power loss variations do not decrease the power level at the base station below the minimum level required for the target error rate. As discussed above, the capacity of a CDMA system is determined by the total power of the transmitted signals. Thus, the increased power level to accommodate varying power loss between adjustments decreases the capacity of the telecommunication system.

In a CDMA wireless communication system, power control is used to maximize the capacity of the system. Subscriber units' output power must be controlled to guarantee enough signal strength received at the base station and to maintain good quality audio while minimizing the potential for interference. Since a CDMA wideband channel is reused in every cell, self interference caused by other users of the same cell and interference caused by users in other cells is the most limiting factor to the capacity of the system. Due to fading and other channel impairments, maximum capacity is achieved when the signal-to-noise ratio (SNR) for every user is, on the average, at the minimum point needed to support acceptable channel performance. Since noise spectral density is generated almost entirely by other user's interference, all signals must arrive at the CDMA receiver with the same average power. This is achieved by providing dynamic power control of the mobile station transceiver.

Power control of the mobile station's transmitter consists of two elements: open loop estimation of transmit power by the mobile station, and closed loop correction of the errors in this estimate by the base station. In open loop power control, each mobile station estimates the total received power on the assigned CDMA frequency channel. Based on this measurement and a correction supplied by the base station, the mobile station's transmitted power is adjusted to match the estimated path loss, to arrive at the base station at a predetermined level. All mobile stations use the same process and arrive with equal average power at the base station. However, uncontrolled differences in the forward and reverse channels, such as opposite fading that may occur due to the frequency difference and mismatches in the mobile station's receive and transmit chains, can not be estimated by the mobile.

To reduce these errors, each mobile station corrects its transmit power with closed loop power control information supplied by the base station via low rate data inserted into each Forward Traffic Channel. The base station derives the correction information by monitoring the Reverse CDMA Channel, compares this measurement to a threshold, and requests either an increase or decrease depending on the result. In this manner, the base station maintains each reverse channel, and thus all reverse channels, at the minimum received power needed to provide acceptable performance.

In a CDMA wireless communication system as described above, a predetermined number of radio frequency resources, such as transceivers and channel modulator/demodulators (modems) are located at each base station. The number of resources allocated to a particular base station is a function of the anticipated traffic loading conditions. For example, a system in a rural area may only have one omni-directional antenna at each base station, and enough channel modems to support eight simultaneous calls. On the other hand, a base station in a dense urban area may be co-located with other base stations, each having several highly directional antennas, and enough modems to handle forty or more simultaneous calls. It is in these more dense urban areas that cell site capacity is at a premium and must be monitored and managed closely in order to provide the most efficient allocation of limited resources while maintaining acceptable quality of communications.

Sector/cell loading is the ratio of the actual number of users in the sector to the maximum theoretical number that the sector can support. This ratio is proportional to total interference measured at the receiver of the sector/cell. The maximum number of users that the sector/cell can support is a function of the aggregate signal-to-noise ratio, voice activity, and interference from other cells. The individual subscriber unit signal-to-noise ratio depends on subscriber unit speed, radio frequency propagation environment, and the number of users in the system. Interference from other cells depends on the number of users in these cells, radio frequency propagation losses and the way users are distributed. Typical calculations of the capacity assumes equal signal-to-noise ratio for all users and nominal values of voice activity and interference from other cells. However, the signal-to-noise ratio changes from user to user and frequency reuse efficiency varies from sector to sector. Hence there is a need to continuously monitor the loading of a sector or cell.

A conventional way to monitor cell site loading conditions is for a person, usually a network engineer or technician employed by a wireless communication service provider, to travel from cell to cell making loading condition readings using specially designed and expensive test equipment. The logged data is then returned to a central processing facility for post-processing and analysis. Some significant drawbacks to this method are that the data can not be evaluated in real-time, and that significant errors are introduced due to propagation effects between the base station and the measurement equipment. Thus, this monitoring method only provides a rough estimate of cell site loading conditions, and can only be used in a time-delayed fashion to take corrective action, such as reassigning resources for the future. It does not enable the service provider to take any real-time action to improve loading conditions and their effect on system performance. Additionally, it requires a person to travel to each site serially, thus providing a discontinuous "hit or miss" estimate of the peak loading condition and consequent system performance depending on whether the visit coincided with the actual (rather than assumed) peak usage times.

Another possible way of monitoring cell site loading conditions is to access the performance data logged by the base station itself, or the base station controller. This procedure suffers from the non-real time post-processing problems as previously mentioned. What is needed is a simple and accurate real-time load monitoring system.

SUMMARY OF THE INVENTION

The present invention is a novel and improved method for monitoring the real time loading condition in a CDMA wireless communication system. The level of the power control signal is obtained by monitoring, in real time, at the base station the forward link CDMA channel, comparing this measurement to the previously obtained level, and displaying the level of the power control signal as a line which can consist of two parts. The first part can be a solid line the length of which represents the level of the power control signal in real time and the second part can be a dotted line whose length increases slowly and decreases rapidly to indicate that the level of the power control signal is rising. Conversely, a rapid increase and a slow decrease of the length of the dotted line indicates that the level of the power control signal is falling. Color coding can be used to indicate that the level of the power control signal is at or outside an optimum operating range.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and where:

DETAILED DESCRIPTION

Figure 1:
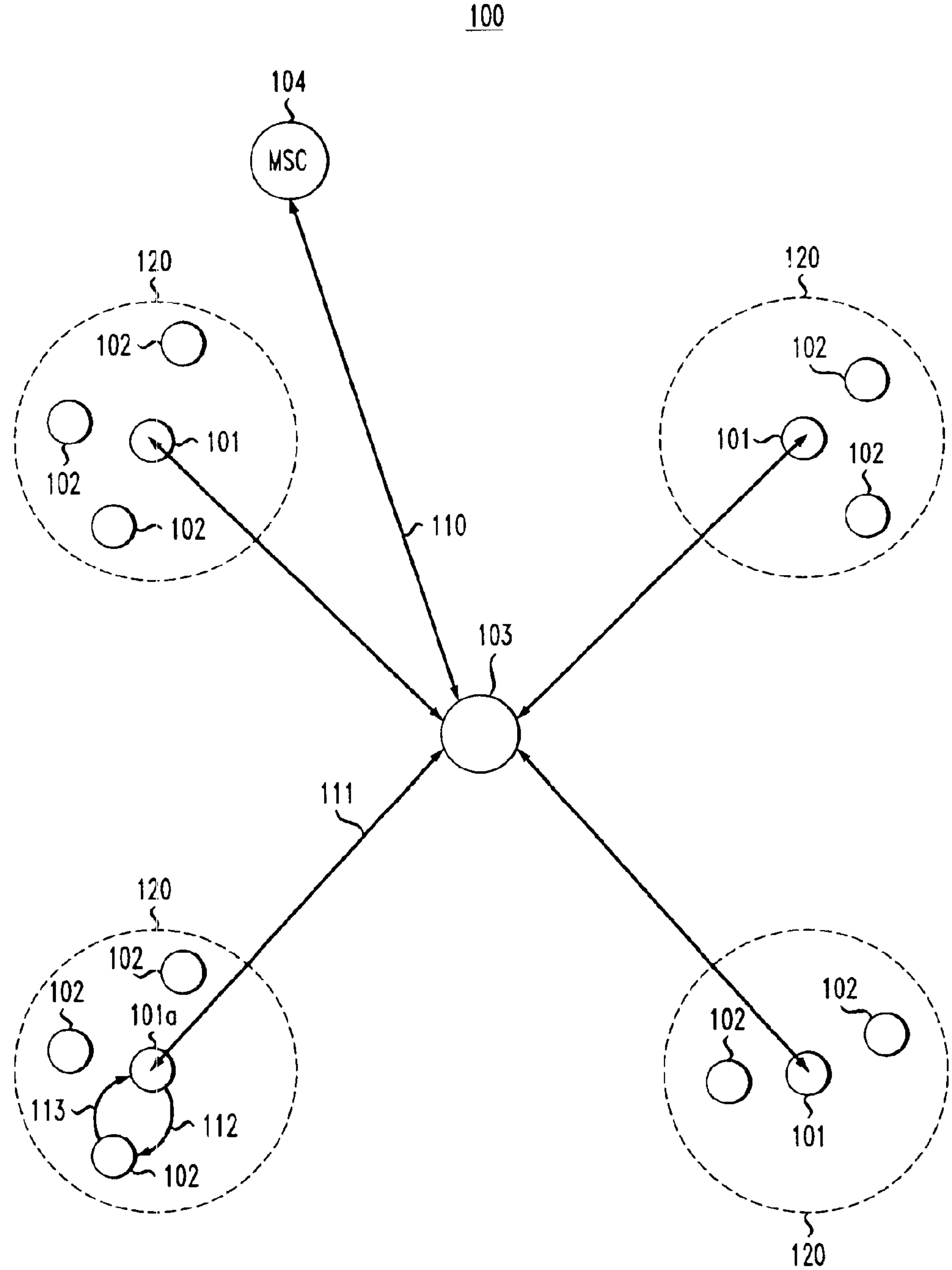
FIG. 1 illustrates a basic schematic diagram of a cellular system having micro cells.

Referring to FIG. 1, a mobile switching center (MSC) 104 controls a base station 103 over a link 110 which can be a land wire or wireless link. The base station 103, in turn, employs a plurality of micro cells 101 to broadcast and receive signals at the same frequency over an area 120. As used herein, the term "micro cell" broadly refers to a subdivision of a cell served by a base station. Communication between the base station and a micro cell occurs over a link 111, which can be optical fiber, metallic wire, coaxial cable, wireless channels, or other suitable means depending upon the application. The micro cells of a cell typically transmit at the same frequency thereby effectively expanding the area that a given base station may serve.

A particular micro cell 101*a* serves a set of subscriber terminals 102. The term "terminal" as used herein broadly refers to any wireless device used by a user to receive and transmit signals in a wireless system. The terminal should be capable of transmitting a signal responsive to the signal it receives. Suitable terminals include cellular hand sets and wireless modems.

Wireless communication occurs between the subscriber terminals 102 and the microcell 101. Down link (or forward) signals 112 propagate from the MSC 104 to the subscriber terminal 102, and up link (or reverse) signals 113 propagate from the subscriber terminal 102 to the MSC 104.

The system also includes a feedback means (not shown) which enables the terminal 102 to provide an up link response indicative of a particular down link signal. As used herein, the term "feedback" broadly refers to a response from a terminal indicating the power level, frequency, quality, or the existence of a signal transmitted from a microcell.

Figure 2:
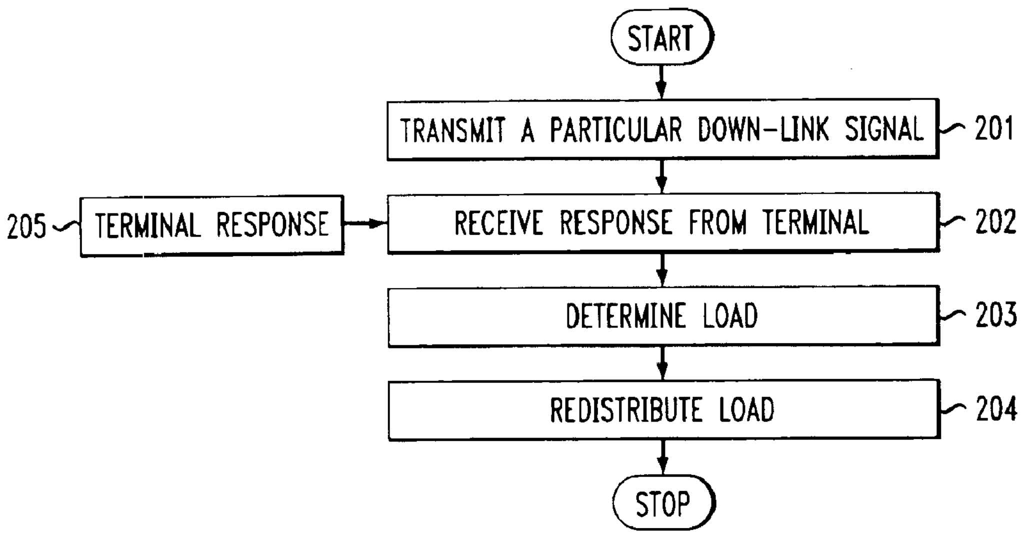
FIG. 2 illustrates a basic flow diagram of the process.

Referring to FIG. 2, in Block 201, a microcell transmits a particular down link signal to at least one terminal 205. Upon receiving the particular down link signal, terminal 205 provides an up link response indicative of the particular down link signal. Block 202 receives and records the up link response. In Block 203, the subscriber load on the microcell is determined by tabulating the number of up link responses that reflect the particular down link signal. The load on the base station is obtained by adding together the loads of all the microcell that are serviced by the base station.

Obtaining the load on a base station provides important process information to the system which can be utilized to optimize the system's performance. For example, the load information is used to optimize the system's capacity by adjusting the microcell's carrier frequency to balance the load between cells. Load information can also be used for purposed of trouble shooting, interference evaluation, etc.

CDMA is a spread spectrum technology where multiple narrow band information channels are transmitted over a common wide band carrier by coding with uncorrelated code sequences for each information channel. For reception, the wide band signal is separated out to individual narrow band signals by correlating the wide band signal with the same code sequences. Among its features, CDMA provides feedback control between the base station and the subscriber base in the form of power control. The CDMA terminal telephone system employs down link and up link power control to achieve high capacity, quality, and other benefits.

It is desirable to maximize the capacity of the CDMA system in terms of the number of simultaneous telephone calls that can be handled in a given system bandwidth. The system capacity is maximized if the transmit power of each subscriber terminal is controlled so that its signal arrives at the base station with the minimum required signal-to-noise ratio (Eb/No). Eb/No is the ratio of energy per bit to the noise power spectral density and is the standard figure of measurement by which digital modulation and coding schemes are compared. If a subscriber terminal's signal arrives at the base station with a lower level of received power, then the terminal's performance is degraded. If the received power is too high, the performance of the subscriber terminal is improved, but interference to all the other subscriber terminal transmitters that are sharing the channel is increased, and may result in unacceptable performance to other users unless the capacity is reduced. The objective of the subscriber terminal transmitter power control process is to produce a nominal received signal power from each subscriber terminal transmitter operating within the cell at the base station receiver. Theoretically, regardless of a subscriber terminal's position or propagation loss, each subscriber terminal's signal should be received at the base station at the same level.

A typical CDMA system employs an up link open loop power control, up link closed loop power control, and open link power control. Up link open loop power control is primarily a function of the subscriber terminals. The subscriber terminal rapidly adjusts transmit power according to commands from the base station. In open loop power control, the subscriber terminal measures the received power level from the base station and adjusts its transmit power in an indirectly proportional manner. Open loop power control is a coarse power control that provides a window for close loop power control to operate. The base station supports the power control functions by providing a calibration constant to the served subscriber terminals. The calibration constant is sensitive to the cell load, cell noise figure, antenna gain, and power amplifier output. This constant is sent as part of a broadcast message from the cell to the terminal.

In the up link closed loop power control, the base station takes an active role. The goal of the closed loop portion is for the cell to provide rapid corrections to the subscriber terminal's open loop estimate to maintain the optimum transmit power. The cell measures the relative received power level of each terminal's signal, and compares the signal to an adjustable threshold. The threshold is provided to the base station by the system controller residing at the MSC. Typically, the threshold, the frame erasure rate (FER) is used throughout the cell. This level is passed to the channel controller, where a determination is made periodically (e.g., every 1.25 ms) based upon the signal-to-noise ratio for each mobile station to either transmit a power up command or a power down command to that particular subscriber terminal. This closed loop correction compensates for rapid signal strength variation due to Rayleigh fading and inaccuracies in open loop power control due to unequal propagation losses between the down and up links. This mechanism is called the up link closed loop power control.

The cellular system may also support down link closed loop power control by adjusting the down link power for each subscriber link signal in response to measurements provided by the subscriber terminal. The purpose is to reduce power for units that are either stationary, relatively close to the base station, impacted little by multipath fading and shadowing effects, or experiencing minimal other cell interference. Thus, extra power can be given to units that are either in a more difficult environment or far away from the cell and experiencing high error rates.

The down link power control can be performed by periodically reducing the power at which the base station transmits to the subscriber. This process continues until the subscriber, sensing an increase in received BER, requests additional power. The base station receives the power adjustment requests from each subscriber terminal and responds by adjusting the power by a predetermined amount.

The present invention provides a method for monitoring in real time, the power control signal at a base station. Currently, a service provider monitors the power control signal at a base station of a wireless network by (a) dumping a block of text or data and checking its value, or (b) by checking peg counts in service measurements data. With the method of (a), a craftshell window on the Operation, Maintenance and Platform (OMP) terminal is opened and a dump command is then provoked. The dump command is a manual input and is not triggered by the system. Therefore, it is not updated in real time and does not provide an indication of current network performance. Consequently, the dump command must be entered repeatedly to obtain and check the most updated or current status of the system. Without current detailed power information, there is no way of knowing when a power control overload status occurs. With the method of (b), that of checking peg counts in service measurement data, the call traffic data is collected hourly and displayed. As the data of hourly based measurements, the status of the designated peg count does not provide a real time indication of the status of the power control system.

The present invention provides in real time the status of the power control system to enable a craftsperson to immediately become aware of and correct an overload condition. In this invention, the Maintenance Request Administration (MRA) system processor is adapted to check the status of the power control system on a real time basis and, using this information, continuously update the Status Display Page (SDP). Thus, with this invention, the status of the power control system can be displayed in real time as a line of varying length where a short length can represent a low power threshold, a long length can represent a high power threshold, and a line of intermediate length can represent an intermediate power level. Additionally, the line can be color coded such that a desired power level can be represented by a line that is colored green or penetrates a green zone, an undesired power level can be indicated by a line that is colored red or penetrates a red colored zone, and an intermediate power level can be illustrated by a line that is yellow or terminates in a zone that is colored yellow. By knowing, in real time, the status of the power control system of the wireless network, a craftsperson can test the performance of the network by adjusting the upper and/or lower threshold values of the power control system. In addition, the craftsperson can determine if a new value of maximum power, or other parameters should be changed to optimize the performance of the system, and this can now be done in real time.

Figure 3:
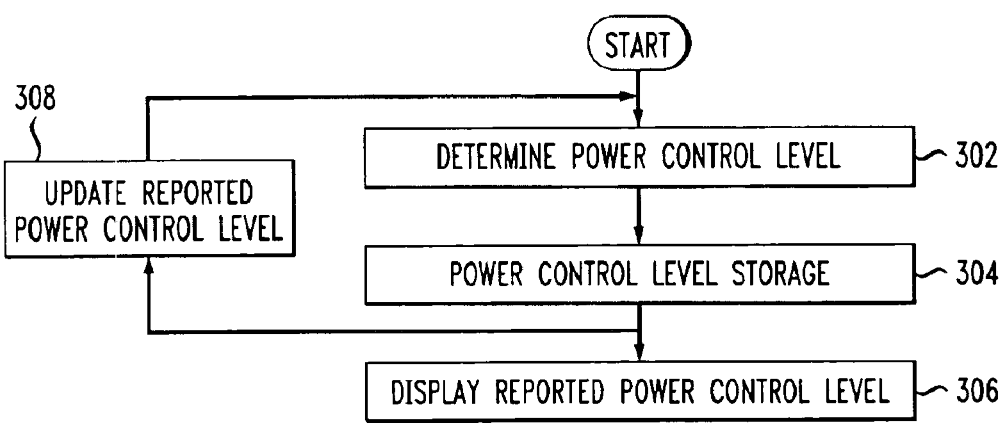
FIG. 3 illustrates a preferred embodiment of the process.

Referring to FIG. 3, there is illustrated a preferred embodiment of the process of the invention. In Block 302 the current Maintenance Request Administration system processor is requested to determine the power control level in real time. Upon obtaining the real time power control level, the value is sent to Block 304 where it is stored and time stamped in a database. The received power control level is compared to previously received power control levels and a resultant is obtained which indicates whether the level of the power control signal is rising, falling or remaining constant. The level of the power control signal in real time and the resultant is sent to Block 306 which displays the level of the power control signal as a line which can extend upward from a fixed point, and where the length of the line represents the magnitude of the power control. A short line can represent a low power control level and a long line can represent a high power control level. The display can also include a lower, an intermediate, and an upper zone through which the line can extend where the lower zone marks a lower power threshold, the intermediate zone indicates a desirable level of power control, and the upper zone an undesired level of power control signal. The display can include a color control which can color the line green when it terminates in the lower zone, red when it terminates in the upper zone, and yellow when it terminates in the intermediate zone. Additionally, the display can include software to provide a second line which extends from the end of the first line and consists of a series of dots or dashes which are moving either toward or away from the end of the first line to indicate that the power control level is either increasing, decreasing or remaining constant. A short time after the level of the power control signal is obtained, Block 308 restarts the process to obtain a new real time power control signal level, and this new signal is then displaying via 306 to the craftsperson.

Knowing the real time load has several important uses. Among these uses is optimizing the capacity and quality of the network by adjusting the power and/or redistributing the load. For example, if the load on a microcell indicates that a particular RF carrier is overloaded, the base station can assign the microcell to a different group of mobiles having less traffic.

Numerous modifications and variations of the present invention are possible and would be obvious in the light of the above techniques. It is therefore understood that within the scope of the appended claims, the invention may be practiced otherwise than as specifically described herein.

The invention claimed is:

1. A method for displaying in real time the level of the power control signal at a base station in a CDMA network comprising a plurality of microcells controlled by the base station, and at least one mobile terminal served by the microcells, the method comprising obtaining the current level of the power control signal and displaying the current level of the power control signal to show in real time the level of the power control signal relative to a threshold level where a less than optimum operating condition can occur in the operation of the CDMA network, the step of displaying the current value of the power control signal comprises:

displaying a line, the length of which represents the current level of the power control signal; and identifying a location along the path of the line which marks where a less than optimum operating condition can occur in the operation of the network, the step of identifying a location comprises a first fixed zone to identify a lower power threshold level, a second fixed zone to identify an upper power threshold level, wherein the line that displays the real time level of the power control signal appears as a first color if displaying desired power control levels and a second if when displaying power control levels that are not desired, the line appearing in two parts, the first part comprising a continuous line the length of which represents the actual real time level of the power control signal and the second part comprising a broken line which increases in length to indicate that the level of the power control signal is increasing or decreases in length to indicate that the level of the power control signal is decreasing.

2. A method of displaying in real time the level of the power control signals a base station in a CDMA network comprising a plurality of microcells controlled by the base station and at least one mobile terminal served by the microcells, the method comprising:

obtaining the current level of the power control signal, storing the obtained current level of the power control signal;

obtaining at a subsequent time, a second current level of the power control signal;

comparing the second current level of the power control signal with the stored level of the power control signal to determine if the level of the power control signal is increasing, decreasing or remaining unchanged;

displaying the second current level of the power control signal to show the real time level of the power control signal; and indicating whether the level of the power control signal is increasing, decreasing or remaining unchanged, wherein the step of displaying the level of the power control signal comprises:

a line, the length of which represents the real time level of the power control signal; and setting a threshold location to which the line can approach, the location marking a level beyond which a less than optimum operating condition can occur in the operation of the network, the step of setting a threshold location comprises setting a first threshold location to identify a lower power threshold level and a second threshold location to identify an upper power threshold level, wherein the line that displays the real time level of the power control signal is a first color if the level of the power control signal is between the lower and upper power threshold levels and a second color if the level of the power control signal is below the lower threshold level or above the upper threshold level, the line having two parts, the first part comprising a continuous line the length of which represents the actual real time level of the power control signal and the second part comprising a dotted line which slowly increases and rapidly decreases in length from the end of the first part to indicate that the level of the power control signal is increasing.

3. A method of displaying in real time the level of the power control signals a base station in a CDMA network comprising a plurality of microcells controlled by the base station and at least one mobile terminal served by the microcells, the method comprising:

obtaining the current level of the power control signal, storing the obtained current level of the power control signal;

obtaining at a subsequent time, a second current level of the power control signal;

comparing the second current level of the power control signal with the stored level of the power control signal to determine if the level of the power control signal is increasing, decreasing or remaining unchanged;

displaying the second current level of the power control signal to show the real time level of the power control signal; and indicating whether the level of the power control signal is increasing, decreasing or remaining unchanged, wherein the step of displaying the level of the power control signal comprises:

a line, the length of which represents the real time level of the power control signal; and setting a threshold location to which the line can approach, the location marking a level beyond which a less than optimum operating condition can occur in the operation of the network, the step of setting a threshold location comprises setting a first threshold location to identify a lower power threshold level and a second threshold location to identify an upper power threshold level, wherein the line that displays the real time level of the power control signal is a first color if the level of the power control signal is between the lower and upper power threshold levels and a second color if the level of the power control signal is below the lower threshold level or above the upper threshold level, the line having two parts, the first part comprising a continuous line the length of which represents the actual real time level of the power control signal and the second part comprising a dotted line which slowly decreases and rapidly increases in length from the end of the first part to indicate that the level of the power control signal is decreasing.

* * * * *